United States Patent
Higbie et al.

(10) Patent No.: US 11,352,953 B2
(45) Date of Patent: Jun. 7, 2022

(54) ACOUSTIC PANEL WITH REINFORCED LIP

(71) Applicant: Rolls-Royce Corporation, Indianapolis, IN (US)

(72) Inventors: Jeff Higbie, Indianapolis, IN (US); Robert Heeter, Noblesville, IN (US); Ben Hodgson, Indianapolis, IN (US); Jon Rivers, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 536 days.

(21) Appl. No.: 16/376,767

(22) Filed: Apr. 5, 2019

(65) Prior Publication Data

US 2020/0318540 A1 Oct. 8, 2020

(51) Int. Cl.
*F02C 7/045* (2006.01)
*F02C 7/24* (2006.01)

(52) U.S. Cl.
CPC ............... *F02C 7/045* (2013.01); *F02C 7/24* (2013.01); *F05D 2260/96* (2013.01)

(58) Field of Classification Search
CPC ......... F02C 7/045; F02C 7/24; F05D 2260/96
USPC ....................................................... 181/290
See application file for complete search history.

(56) References Cited

U.S. PATENT DOCUMENTS

| | | | |
|---|---|---|---|
| 5,756,182 A | 5/1998 | Landi et al. | |
| 6,761,245 B2 | 7/2004 | Porte | |
| 6,920,958 B2 | 7/2005 | Harrison | |
| 7,866,939 B2 | 1/2011 | Harper et al. | |
| 7,967,108 B2 | 6/2011 | Harper | |
| 8,186,934 B2 | 5/2012 | Humphries | |
| 8,650,853 B2 | 2/2014 | Porte et al. | |
| 9,290,274 B2 | 3/2016 | Roach et al. | |
| 9,341,142 B2 * | 5/2016 | Bellanger | B64D 29/06 |
| 9,771,726 B2 * | 9/2017 | Edmonds | E04B 1/8409 |
| 9,779,715 B1 * | 10/2017 | Seldal | B29D 24/005 |
| 9,932,897 B2 | 4/2018 | Riou et al. | |

(Continued)

FOREIGN PATENT DOCUMENTS

| | | |
|---|---|---|
| EP | 0 894 613 A1 | 2/1999 |
| GB | 2 319 589 A | 5/1998 |

(Continued)

OTHER PUBLICATIONS

Extended European Search Report, dated Aug. 31, 2020, pp. 1-12, issued in European Patent Application No. 20166565.0-1001, European Patent Office, Munich, Germany.

*Primary Examiner* — Forrest M Phillips
(74) *Attorney, Agent, or Firm* — Crowell & Moring LLP

(57) ABSTRACT

Systems and methods are presented for dampening noise in a rotating machine having a rotatable shaft defining an axis of rotation. An acoustic panel assembly may comprise an annular casing, a hook, and an acoustic panel carried by the hook. The acoustic panel comprises a radially inner skin, a radially outer skin, and an acoustic treatment member having a plurality of walls extending between the radially inner skin and the radially outer skin thereby defining a plurality of radially oriented cells. A portion of the cells adjacent a first axial edge of the acoustic panel are filled with a reinforcement material and shaped to form a lip having sufficient strength to support a portion of the acoustic panel. The panel is positioned so that the lip is axially and radially retained by the hook.

17 Claims, 5 Drawing Sheets

(56) References Cited

U.S. PATENT DOCUMENTS

| | | |
|---|---|---|
| 9,938,852 B2 | 4/2018 | Lumbab et al. |
| 2008/0069688 A1 | 3/2008 | Harper et al. |
| 2009/0321178 A1 | 12/2009 | Durchholz |
| 2010/0206664 A1* | 8/2010 | Bagnall ................ G10K 11/172 181/214 |
| 2015/0023780 A1 | 1/2015 | Costa et al. |
| 2016/0201317 A1* | 7/2016 | Liou .................... E04B 1/8209 181/290 |

FOREIGN PATENT DOCUMENTS

| | | |
|---|---|---|
| GB | 2 407 344 A | 4/2005 |
| JP | 2006002869 A | 1/2006 |

* cited by examiner

ACOUSTIC PANEL WITH REINFORCED LIP

BACKGROUND

Acoustic panels may be used in rotating machines to reduce, dampen, or treat noise emanating from the machine. For example, acoustic panels may be used in modern gas turbine engines in an effort to meet regulatory restrictions on noise emissions from the engine. Generally speaking, acoustic panels may be used to line radially outer portions of gas flowpaths in the engine. The acoustic panels typically comprise a structure or materials that reduce, dampen, or treat noise.

SUMMARY

According to some aspects of the present disclosure, an acoustic panel assembly is disclosed for dampening noise in a rotating machine. The rotating machine comprises a rotatable shaft defining an axis of rotation. The acoustic panel assembly comprises an annular casing, a hook, and an acoustic panel. The annular casing is disposed about at least a portion of the rotatable shaft. The hook extends radially inward and axially from the casing. The acoustic panel comprises a radially inner skin, a radially outer skin, and an acoustic treatment member. The acoustic treatment member comprises a plurality of walls extending between the radially inner skin and the radially outer skin thereby defining a plurality of radially oriented cells. A portion of the radially oriented cells adjacent a first axial edge of the acoustic panel are filled with a reinforcement material and shaped to form a lip having sufficient strength to support the acoustic panel along the first axial edge. The panel is positioned so that the lip is axially and radially retained by the hook to thereby support the first axial edge of the acoustic panel from the casing.

In some embodiments the lip defines a radially inward facing mating surface, and wherein at least a portion of the mating surface is covered with a protective member. In some embodiments the acoustic panel assembly further comprises a damper ring positioned between the protective member and the hook. In some embodiments the lip is formed along a first axial edge of the acoustic panel, and wherein the acoustic panel is affixed to the annular casing proximate a second axial edge opposite the first axial edge. In some embodiments the acoustic panel is affixed by a fastener.

In some embodiments the plurality of radially oriented cells form a honeycomb pattern. In some embodiments the hook comprises a radial member extending radially inward from the casing and an axial member extending axially from the radial member and being spaced from the casing. In some embodiments the acoustic panel is radially retained by the axial member of the hook.

According to further aspects of the present disclosure, an acoustic panel array is disclosed for dampening noise in a rotating machine. The rotating machine comprises a rotatable shaft defining an axis of rotation. The acoustic panel array comprises an annular casing, an annular hook, and three or more acoustic panels. The annular casing is disposed about at least a portion of the rotatable shaft. The annular hook extends radially inward and axially from the casing. The three or more acoustic panels each comprise a radially inner skin, a radially outer skin, and an acoustic treatment member. The acoustic treatment member comprises a plurality of walls extending between the radially inner skin and the radially outer skin thereby defining a plurality of radially oriented cells. A portion of the radially oriented cells adjacent a first axial edge of the acoustic panel are filled with a reinforcement material and shaped to form a lip having sufficient strength to support the first axial edge of the acoustic panel. Each of the panels is positioned so that the lip is axially and radially retained by the hook to thereby support the first axial edge of the acoustic panel from the casing. The three or more acoustic panels are positioned about a circumference of the annular casing and are axially aligned to form an annulus of acoustic panels.

In some embodiments each of the acoustic panels is separated from an adjacent panel by a gap. In some embodiments the lip of each acoustic panel defines a radially inward facing mating surface, and wherein the mating surface is lined with a protective member. In some embodiments the acoustic panel array further comprises an annular damper ring positioned between the protective member of each acoustic panel and the hook. In some embodiments the lip of each acoustic panel is formed along a first axial edge of the acoustic panel, and wherein the acoustic panel is affixed to the annular casing proximate a second axial edge opposite the first axial edge via a fastener.

According to yet further aspects of the present disclosure, a method is disclosed of forming an acoustic panel for dampening noise in a rotating machine. The method comprises bonding an acoustic treatment member between a first skin and a second skin, the acoustic treatment member comprising a plurality of walls extending between the first skin and the second skin to thereby define a plurality of radially oriented cells; removing a portion of the first skin and acoustic treatment member adjacent one axial edge of the panel to thereby form a lip; and filling the radially oriented cells that intersect the lip with a reinforcement material to thereby form the lip to have sufficient strength to support the acoustic panel along the lip.

In some embodiments the method further comprises lining the lip with a protective member. In some embodiments the step of filling the radially oriented cells comprises filling all radially oriented cells that intersect the lip and adjacent radially oriented cells with a reinforcement material. In some embodiments the method further comprises curing the reinforcement material. In some embodiments the reinforcement material is an elastomer. In some embodiments the protective member comprises composite. In some embodiments protective member comprises fiberglass.

BRIEF DESCRIPTION OF THE DRAWINGS

The following will be apparent from elements of the figures, which are provided for illustrative purposes.

Figure 1:
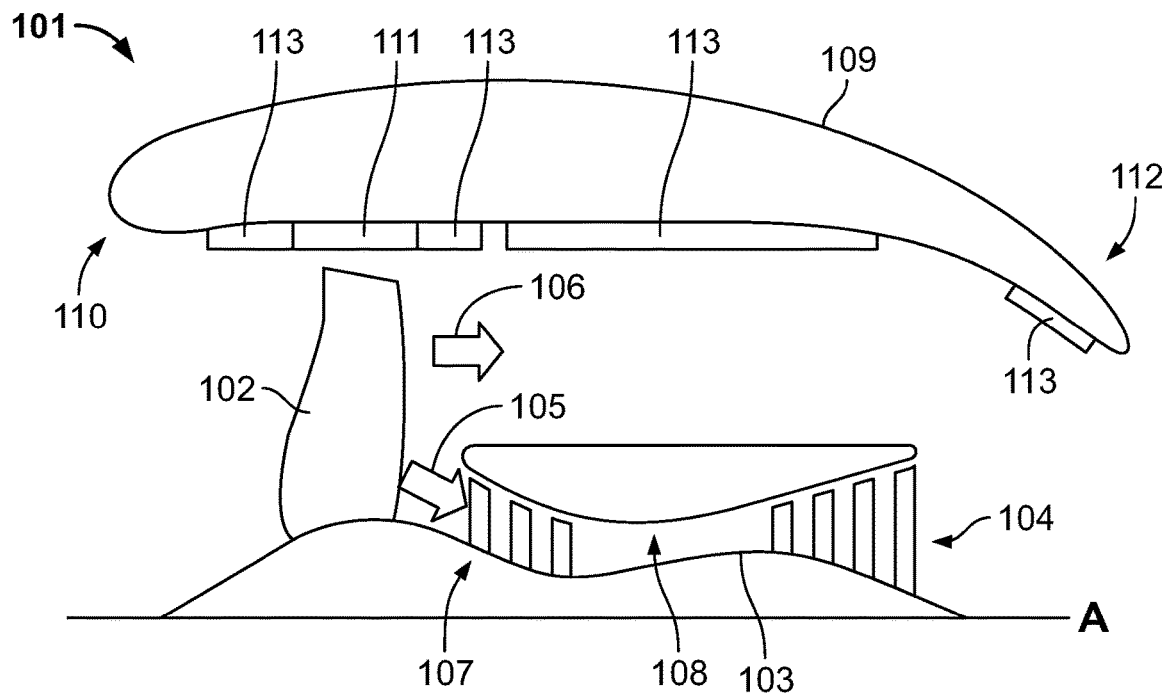
FIG. 1 is a schematic cross-sectional view of acoustic panels positioned in a rotating machine in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

The present disclosure is directed to systems and methods of acoustic dampening in rotating machines. A system for acoustic dampening may include an acoustic panel comprising an inner skin, an outer skin, and an acoustic treatment member extending between the inner and outer skins. The acoustic treatment member may define a plurality of radially oriented cells. A portion of the acoustic treatment member may be shaped to form a lip, and cells along or intercepting the lip may be filled with a reinforcement material such that the lip has sufficient strength to support the acoustic panel when mounted to a casing of the rotating machine. The lip may be axially and radially retained by a hook extending from the casing. A method of acoustic dampening may include forming an acoustic panel as described above and affixing the panel to the casing.

FIG. 1 presents a schematic cross-sectional view of the placement of acoustic panels 113 in a rotating machine. The rotating machine in the examples provided throughout this disclosure is a gas turbine engine 101, although the disclosure is not so limited. The engine 101 may comprise a fan 102 driven by a turbine 104 via a rotatable shaft 103. The shaft 103 defines an axis of rotation A. Air passing through the fan 102 is split into a core flowpath 105 and a bypass flowpath 106. The core flowpath 105 comprises a compressor 107, combustor 108, and turbine 104. The bypass flowpath 106 is disposed radially outward of the core flowpath 105. The engine 101 is encased by a casing 109. The casing 109 may define an inlet cowl 110. A fan liner 111 may be affixed to the casing 109 and positioned radially outward of the fan 102. The engine 101 may have a thrust reverser 112.

The acoustic panels 113 may be positioned generally in one or more of the following locations: in the inlet cowl 110 forward of the fan liner 111; in the inlet cowl 110 aft of the fan liner 111; along the casing 109 that defines a portion of the bypass flowpath 106; or in the thrust reverser 112. One or more acoustic panels 113 may be arranged about the circumference of a gas flowpath to form an annular acoustic panel array. An array may be formed by any number of acoustic panels 113. For example, an annular acoustic panel array may be formed by four acoustic panels 113 positioned in axial alignment about a circumference of a gas flowpath.

Figure 2:
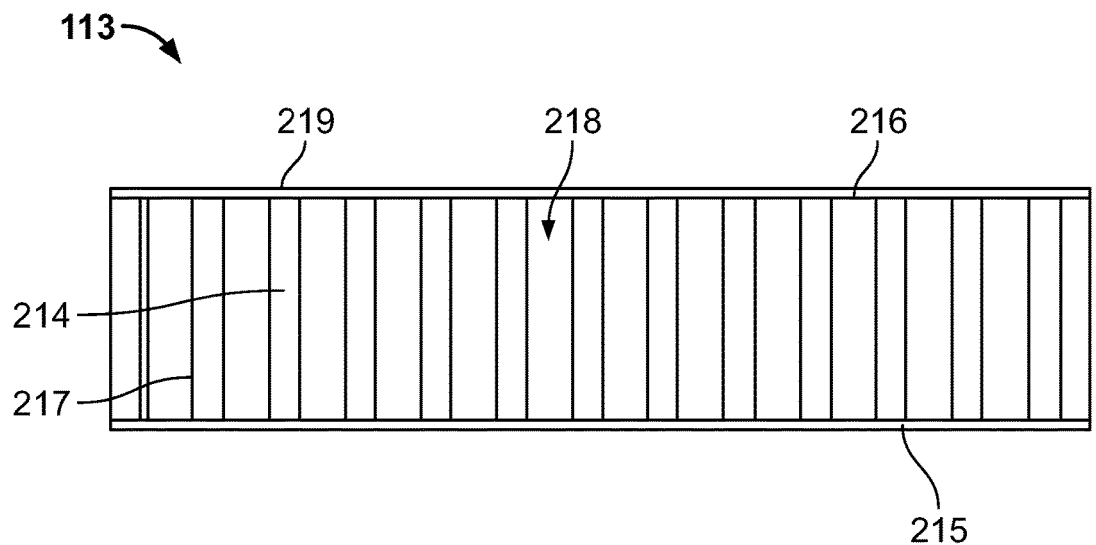
FIG. 2 is a schematic cross-sectional view of an acoustic panel in accordance with some embodiments of the present disclosure.
Figure 3:
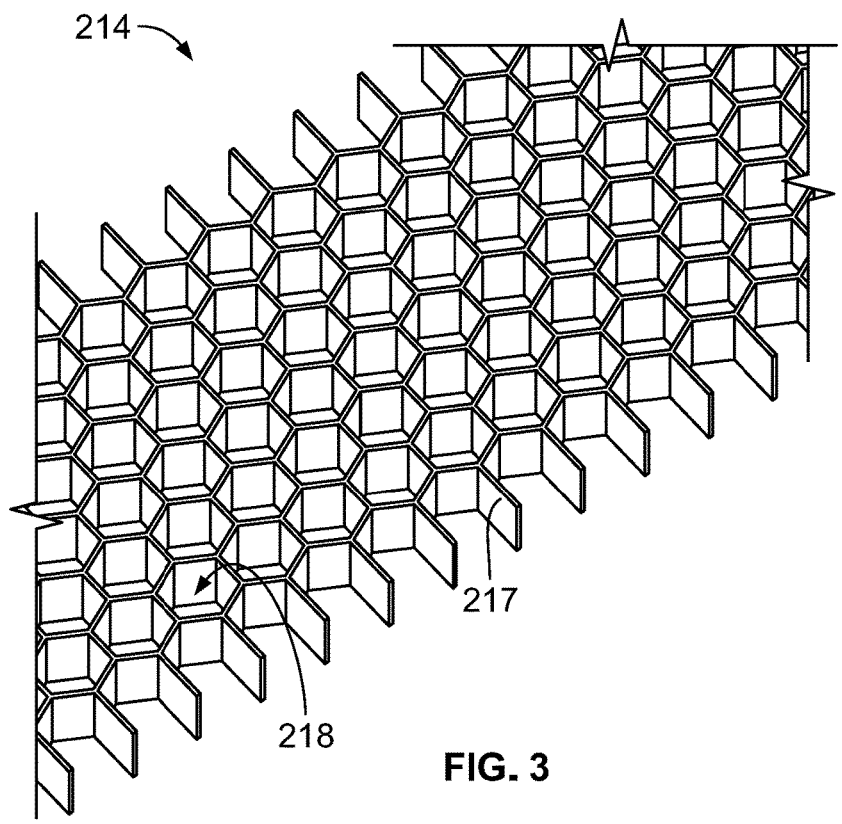
FIG. 3 is an isometric view of an acoustic treatment member of an acoustic panel in accordance with some embodiments of the present disclosure.

FIG. 2 provides a schematic cross-sectional view of an acoustic panel 113, with the cross section taken along an axis of rotation A of the rotating machine. FIG. 3 provides an isometric view of an acoustic treatment member 214 of an acoustic panel 113.

Each acoustic panel 113 may comprise an acoustic treatment member 214 extending between a radially inner skin 215 and radially outer skin 216. The acoustic treatment member 214 may have a plurality of walls 217 that define a plurality of radially-oriented cells 218. The walls 217 may define a plurality of radially oriented cells 218 in a honeycomb as shown in FIG. 3. The walls 217 may comprise aluminum or composite. The acoustic treatment member 214 may entirely overlay the radially inner skin 215.

The acoustic panel 113 of FIG. 2 comprises an acoustic treatment member 214 radially bound by the radially inner skin 215 and radially outer skin 216. The radially inner skin 215 faces the rotatable shaft 103 of the engine 101. The radially inner skin 215 may define at least a portion of a radially outer boundary of a gas flowpath of the engine, such as the bypass flowpath 106. The radially inner skin 215 may be arcuate.

The radially outer skin 216 faces away from the rotatable shaft 103 and toward the casing 109. The radially outer skin 216 may define a radially outward facing mating surface 219. The radially outer skin 216 may be arcuate. Each of the radially inner skin 215 and radially outer skin 216 may comprise composite, such as a fiber reinforced composite such as fiberglass or similar material.

Figure 4:
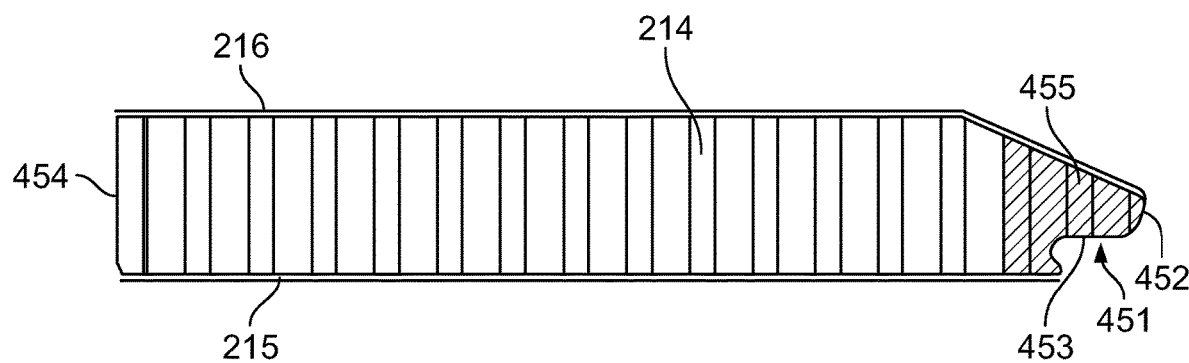
FIG. 4 is a schematic cross-sectional view of a portion of an acoustic panel affixed to a casing in accordance with some embodiments of the present disclosure.
Figure 5:
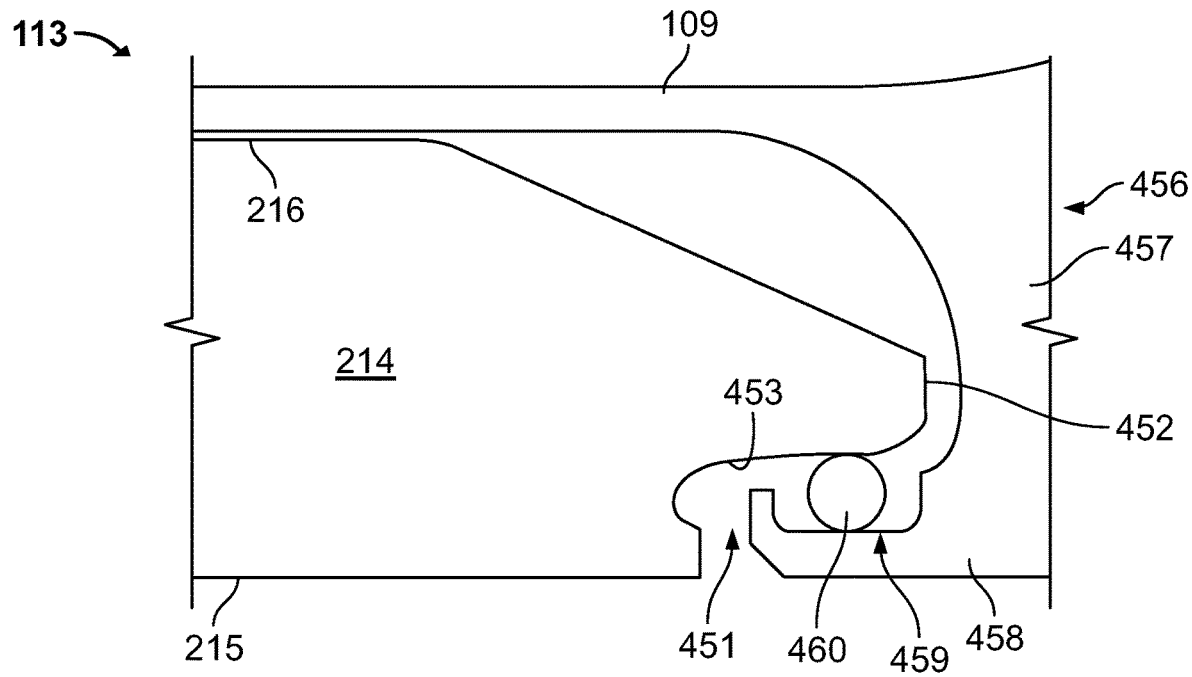
FIG. 5 is a schematic cross-sectional view of an acoustic panel in accordance with some embodiments of the present disclosure.

In some embodiments an acoustic panel 113 may be affixed to a casing 109 using fasteners. In some embodiments, an acoustic panel 113 may be carried in whole or in part by structures of the casing 109. The acoustic panel 113 may be axially and/or radially retained by such structures. An example of such an embodiment is provided in FIGS. 4 and 5.

The acoustic panel 113 may be shaped to form a lip 451 along a first axial edge 452 of the acoustic panel 113. The lip 451 may be formed by filling the radially oriented cells 218 along, adjacent, or proximate the first axial edge 452 with a reinforcement material 455 and by machining away a portion of the radially inner skin 215 and acoustic treatment member 214. The reinforcement material 455 may completely or partly fill each cell 218 that intersects the lip 451. Partly filled cells 218 may be partly filled in a radial or axial direction. The reinforcement material 455 may completely or partly fill each cell that intersects the lip 451 as well as adjacent cells. With use of the reinforcement material 455, the lip 451 is shaped having sufficient strength to support a portion of the acoustic panel 113 along the first axial edge 452. The reinforcement material 455 may be an elastomer, such as a potting material.

The lip 451 may define a radially inward facing mating surface 453. The acoustic panel 113 may taper toward the first axial edge 452. The acoustic panel 113 may be affixed to the casing 109 along a second axial edge 454 opposite the first axial edge 452 with fasteners.

A hook 456 may extend radially and axially from the casing 109. In the illustrated embodiment of FIG. 5, the hook 456 comprises a radial member 457 extending radially inward from the casing 109 and an axial member 458 extending axially forward from the radial member 457 and spaced from the casing 109. The axial member 458 may define a groove 459 that axially and radially retains a damper ring 460 positioned between the acoustic panel 113 and the hook 456. More specifically, the damper ring 460 may be positioned between the radially inward facing mating surface 453 of the lip 451 and the axial member 458 of the hook 456.

The hook 456 and damper ring 460 may be annular and the hook 456 may form a continuous surface for carrying or retaining the acoustic panel 113. The acoustic panel 113 may be axially retained by the radial member 457 and radially retained by the axial member 458. The damper ring 460 may be formed from a flexible or semi-rigid material and may serve to allow a degree of relative movement between the acoustic panel 113 and hook 456 without excessive vibrations. The damper ring 460 may be referred to and serve as a radial bumper bearing.

Figure 6:
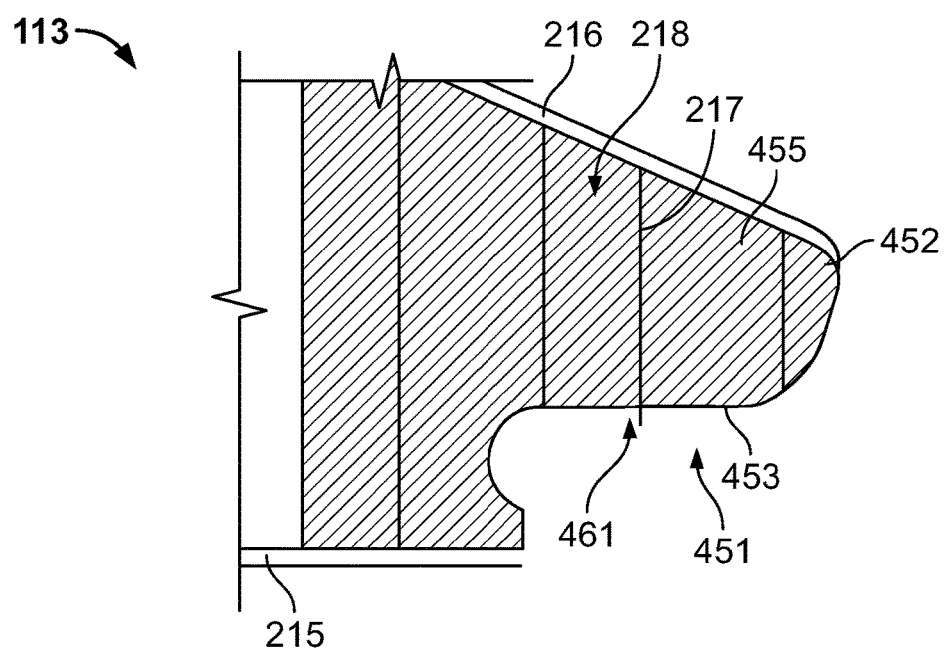
FIG. 6 is a schematic cross-sectional view of a portion of an acoustic panel in accordance with some embodiments of the present disclosure.

As shown in FIG. 6, in forming the lip 451 a wall portion 461 may protrude beyond the radially inward facing mating surface 453 due to imperfections or inconsistencies in the machining process. Similarly, the radially inward facing mating surface 453 of the lip 451 may wear over time, for example due to differing wear rates between the walls 217 and reinforcement material 455, and result in a wall portion 461 protruding beyond the radially inward facing mating surface 453. A protruding wall portion 461 may be undesirable as it may damage the damper ring 460. This damage can lead to degradation and/or failure of the damper ring 460, thus causing harmful leak-by past the radial bumper bearing and/or vibrations of the acoustic panel 113.

Figure 7:
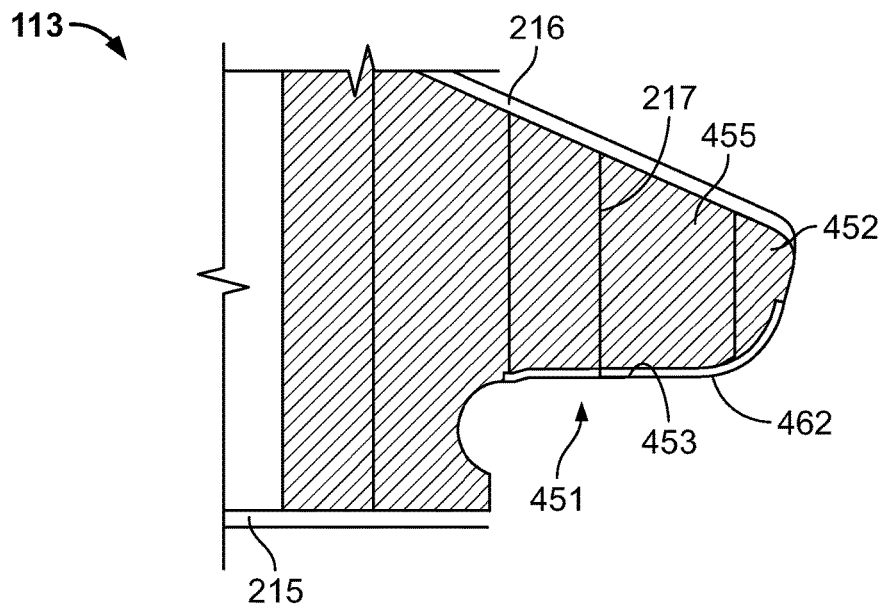
FIG. 7 is a schematic cross-sectional view of a portion of an acoustic panel in accordance with some embodiments of the present disclosure.

As a result, in some embodiments the radially inward facing mating surface 453 may be lined or covered with a protective member 462. Such an embodiment is illustrated in FIG. 7. The protective member 462 may comprise a layer of paint, a single- or multi-ply fiberglass cover or fiberglass tape, or a composite. The protective member 462 may be applied to areas beyond that illustrated in FIG. 7 to include, in some embodiments, the first axial edge 452 and axially facing surfaces of the lip 451.

Figure 8:
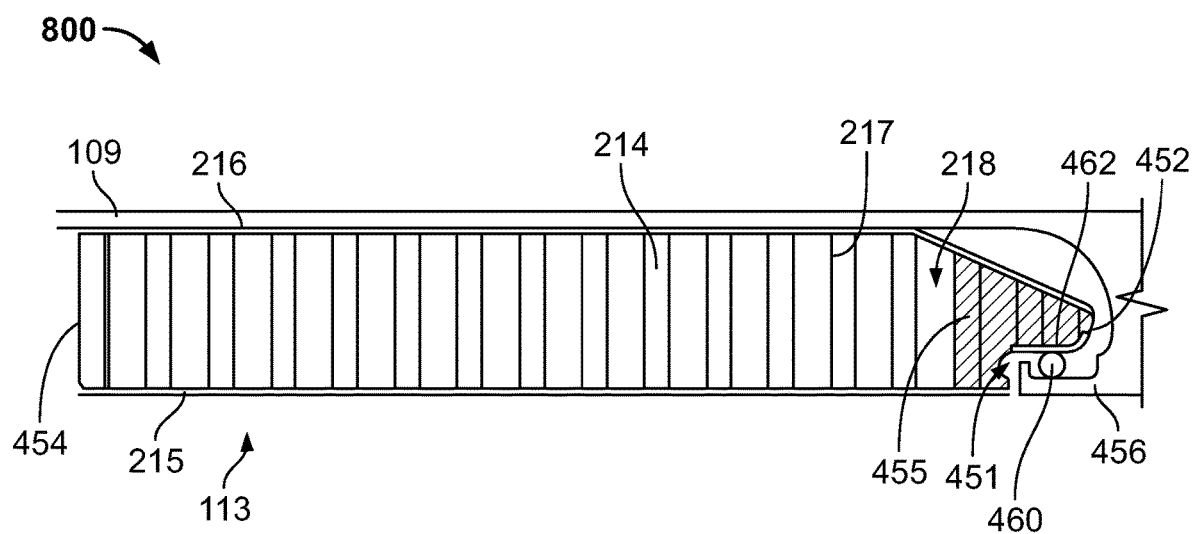
FIG. 8 is a schematic cross-sectional view of an acoustic panel affixed to a casing in accordance with some embodiments of the present disclosure.

FIG. 8 is a schematic cross-sectional view of an acoustic panel 113 affixed to a casing 109, with the cross section taken along an axis A of the engine 101, in accordance with some embodiments of the present disclosure. As shown in FIG. 8, an acoustic panel assembly 800 or system for acoustic dampening in a rotating machine such as an engine 101 may comprise an annular casing 109 and an acoustic panel 113 affixed to the annular casing 109.

The annular casing 109 of the engine 101 is disposed radially outward of at least a portion of the rotatable shaft 103. The annular casing 109 may comprise a hook 456 that extends radially inward and axially from the casing 109.

The acoustic panel 113 may comprise a radially inner skin 215, radially outer skin 216, and an acoustic treatment member 214 partly bounded by the radially inner skin 215 and radially outer skin 216. The acoustic treatment member 214 may comprise a plurality of radially oriented walls 217 extending between the radially inner skin 215 and radially outer skin 216 to form a plurality of radially oriented cells 218. A portion of the cells 218 adjacent a first axial edge 452 of the acoustic panel 113 may be filled with a reinforcement material 455 and the acoustic panel 113 may be shaped along the first axial edge 452 to form a lip 451 having sufficient strength to support the acoustic panel 113 along the first axial edge 452.

The acoustic panel 113 may be positioned so that the lip 451 is axially and radially retained by the hook 456. The acoustic panel 113 may be affixed to the casing 109 along a second axial edge 454 of the acoustic panel 113 with fasteners (not shown). In other embodiments, the acoustic panel 113 may be carried along a second axial edge 454 by a second hook or similar structure.

Figure 10:
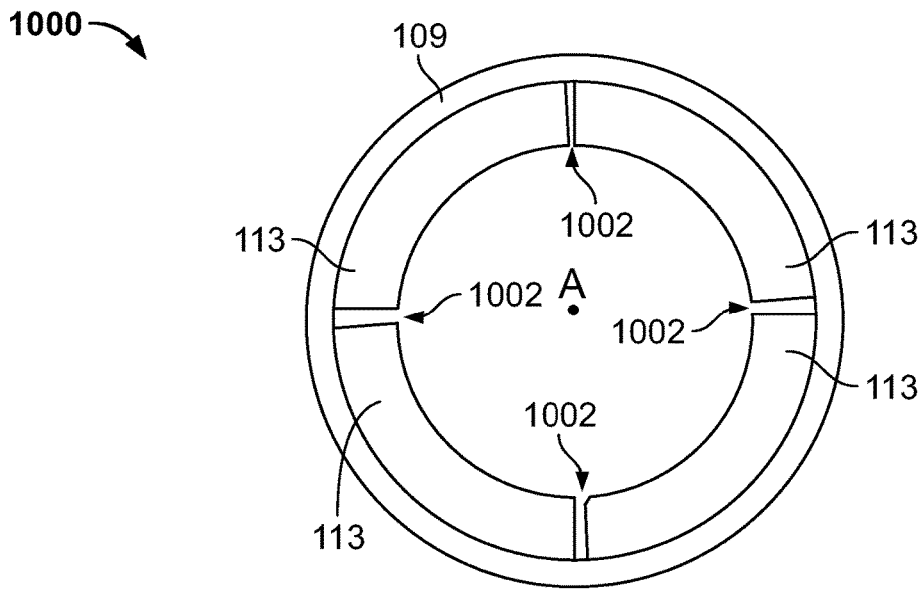
FIG. 10 is a schematic cross sectional view of an acoustic panel array in accordance with some embodiments of the present disclosure.

An acoustic panel array 1000 may be formed from one or more acoustic panels 113 arranged about the circumference of a casing 109. FIG. 10 provides a schematic cross sectional view of an acoustic panel array 1000, with the cross section taken looking down the axis A of the engine 101. The acoustic panels 113 of the acoustic panel array 1000 may be axially aligned with each other. Each of the acoustic panels 113 may be positioned as described above with reference to FIG. 8, such that each acoustic panel 113 has a lip 451 that is axially and radially retained by a hook 456. The acoustic panels 113 may be positioned about the circumference of the casing 109 and may be axially aligned to form an annulus of acoustic panels 113 that is an acoustic panel array 1000. In some embodiments the acoustic panel array 1000 comprises three or more acoustic panels 113. Each acoustic panel 113 may be separated from an adjacent panel by a gap 1002.

Figure 9:
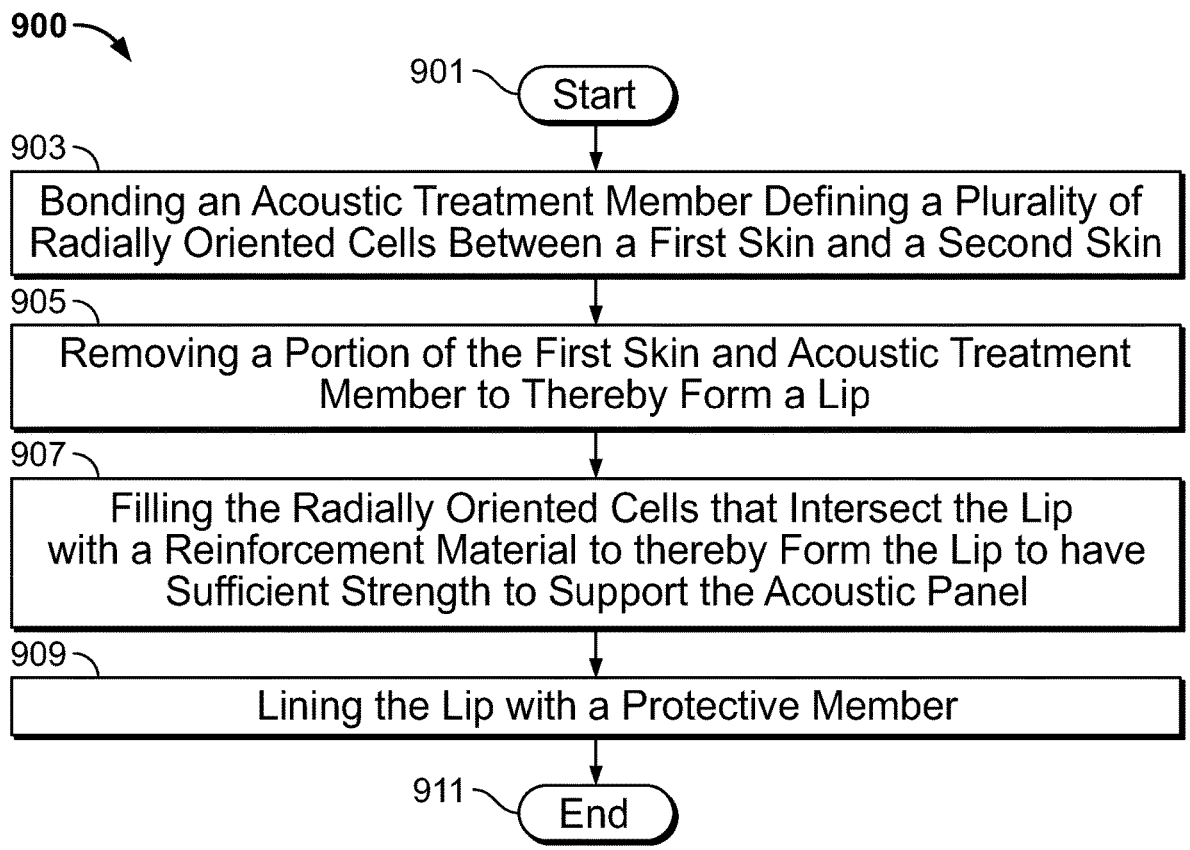
FIG. 9 is a flow diagram of a method in accordance with some embodiments of the present disclosure.

The present disclosure additionally provides methods of forming an acoustic panel 113 for dampening noise in a rotating machine such as an engine 101. One such method 900 is presented in the flow diagram of FIG. 9. Method 900 starts at Block 901. The steps of method 900, presented at Blocks 901 through 911, may be performed in the order presented in FIG. 9 or in another order. One or more steps of the method 900 may not be performed.

At Block 903 an acoustic treatment member 214 is bonded between a radially inner skin 215, or first skin, and a radially outer skin 216, or second skin. The acoustic treatment member 214 may comprise a plurality of walls 217 extending between the first skin and second skin to thereby define a plurality of radially oriented cells 218.

At Block 905 a portion of the first skin and acoustic treatment member 214 is removed to thereby form a lip 451. The portion may be removed by machining of the acoustic panel 113.

At Block 907 the radially oriented cells 218 that intersect the lip 451 are at least partly filled with a reinforcement material 455. The cells 218 that intersect the mounting groove and any adjacent cell 218 may be filled. The reinforcement material 455 may be an elastomer. With filling the cells 218 with reinforcement material 455, a lip 451 is formed having sufficient strength to support the acoustic panel 113 along an axial edge of the acoustic panel 113. Notably, the steps of Block 905 and 907 may be executed in reverse order from that presented in FIG. 9.

At Block 909 the lip 451 may be lined with a protective member 462. The protective member 462 may comprise a layer of paint, a single- or multi-ply fiberglass cover or fiberglass tape, or a composite.

The method 900 may further include the step of curing the reinforcement material 455 after Block 907. Method 900 ends at Block 911.

The presently disclosed systems and methods provide advantages over the prior art of dampening noise in a rotating machine. By providing for a lip of an acoustic panel having sufficient strength to support a portion of the panel, the present disclosure reduces the number of fasteners required to affix the acoustic panel the casing. Reducing the number of fasteners is desirable as it results in a less complex system, greater ease of manufacturing, greater volume of acoustic treatment members available for treatment of noise, and greater ease of installation and removal of the acoustic panel. The use of a structurally reinforced lip also eliminates the need for a separate article of the acoustic panel, such as a compression molded rail, to form the first axial edge of the panel.

The present disclosure additionally provides a protective member between the lip and a hook of the casing in order to reduce or prevent damage to the acoustic panel lip, the hook, or any damper rings therebetween. The protective member may protect: (1) the reinforcement material from being damaged by the edges of the walls or the hook, (2) the edges of the walls from being damages by the hook, and (3) the damper ring from being damaged by the edges of the walls. The protective member may also help distribute the contact forces more evenly across the walls and reinforcement material.

Although examples are illustrated and described herein, embodiments are nevertheless not limited to the details shown, since various modifications and structural changes may be made therein by those of ordinary skill within the scope and range of equivalents of the claims.

What is claimed is:

1. An acoustic panel assembly for dampening noise in a rotating machine, the rotating machine comprising a rotatable shaft defining an axis of rotation, the acoustic panel assembly comprising:
   an annular casing disposed about at least a portion of the rotatable shaft;
   a hook extending radially inward and axially from said casing; and
   an acoustic panel comprising:
      a radially inner skin;
      a radially outer skin; and
      an acoustic treatment member comprising a plurality of walls extending between the radially inner skin and the radially outer skin thereby defining a plurality of radially oriented cells, a portion adjacent a first axial edge of said acoustic panel being filled with a reinforcement material and shaped to form a lip having sufficient strength to support said acoustic panel along the first axial edge,
      wherein said panel is positioned so that said lip is axially and radially retained by said hook to thereby support the first axial edge of said acoustic panel from said casing,
      wherein the lip defines a radially inward facing mating surface, and wherein at least a portion of said mating surface is covered with a protective member, the protective member disposed between the lip and the hook.

2. The acoustic panel of claim 1 further comprising a damper ring positioned between the protective member and the hook.

3. The acoustic panel assembly of claim 1 wherein the lip is formed along a first axial edge of the acoustic panel, and wherein the acoustic panel is affixed to the annular casing proximate a second axial edge opposite the first axial edge.

4. The acoustic panel assembly of claim 3 wherein the acoustic panel is affixed by a fastener.

5. The acoustic panel assembly of claim 1 wherein the plurality of radially oriented cells form a honeycomb pattern.

6. The acoustic panel assembly of claim 1 wherein the hook comprises a radial member extending radially inward from the casing and an axial member extending axially from the radial member and being spaced from said casing.

7. The acoustic panel assembly of claim 6 wherein the acoustic panel is radially retained by said axial member of said hook.

8. An acoustic panel array for dampening noise in a rotating machine, the rotating machine comprising a rotatable shaft defining an axis of rotation, the acoustic panel array comprising:
   an annular casing disposed about at least a portion of the rotatable shaft;
   an annular hook extending radially inward and axially from said casing; and
   three or more acoustic panels, each of said acoustic panels comprising:
      a radially inner skin;
      a radially outer skin; and
      an acoustic treatment member comprising a plurality of walls extending between the radially inner skin and the radially outer skin thereby defining a plurality of radially oriented cells, a portion adjacent a first axial edge of said acoustic panel being filled with a reinforcement material and shaped to form a lip having sufficient strength to support the first axial edge of said acoustic panel,
      wherein each of said panels is positioned so that said lip is axially and radially retained by said hook to thereby support the first axial edge of said acoustic panel from said casing,
   wherein the three or more acoustic panels are positioned about a circumference of the annular casing and are axially aligned to form an annulus of acoustic panels,
   wherein the lip of each acoustic panel defines a radially inward facing mating surface, and wherein at least a portion of said mating surface is lined with a protective member, the protective member disposed between the lip and the hook.

9. The acoustic panel array of claim 8 wherein each of said acoustic panels is separated from an adjacent panel by a gap.

10. The acoustic panel array of claim 8 further comprising an annular damper ring positioned between the protective member of each acoustic panel and the hook.

11. The acoustic panel array of claim 8 wherein the lip of each acoustic panel is formed along a first axial edge of the acoustic panel, and wherein the acoustic panel is affixed to the annular casing proximate a second axial edge opposite the first axial edge via a fastener.

12. A method of forming an acoustic panel for dampening noise in a rotating machine, the method comprising:
   bonding an acoustic treatment member between a first skin and a second skin, the acoustic treatment member comprising a plurality of walls extending between the first skin and the second skin to thereby define a plurality of radially oriented cells;
   removing a portion of the first skin and acoustic treatment member adjacent one axial edge of said panel to thereby form a lip;
   filling the radially oriented cells that intersect the lip with a reinforcement material to thereby form the lip to have sufficient strength to support said acoustic panel along said lip, wherein the lip defines a radially inward facing mating surface; and
   lining at least a portion of said mating surface with a protective member to protect an edge of the walls from being damaged by a hook of an annular casing of the rotating machine, the protective member disposed between the lip and the hook.

13. The method of claim 12 wherein the step of filling the radially oriented cells comprises filling all radially oriented cells that intersect the lips and adjacent radially oriented cells with a reinforcement material.

14. The method of claim 13 further comprising:
curing the reinforcement material.

15. The method of claim 13 wherein said reinforcement material is an elastomer.

16. The method of claim 12 wherein said protective member comprises composite.

17. The method of claim 12 wherein said protective member comprises fiberglass.

\* \* \* \* \*